Sept. 11, 1956     E. L. IRELAND     2,762,320
APPARATUS FOR BAKING PIES
Filed Jan. 28, 1952
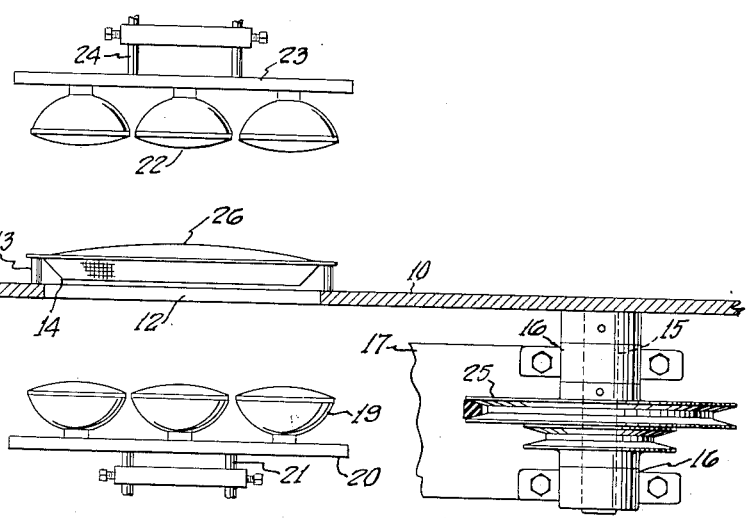
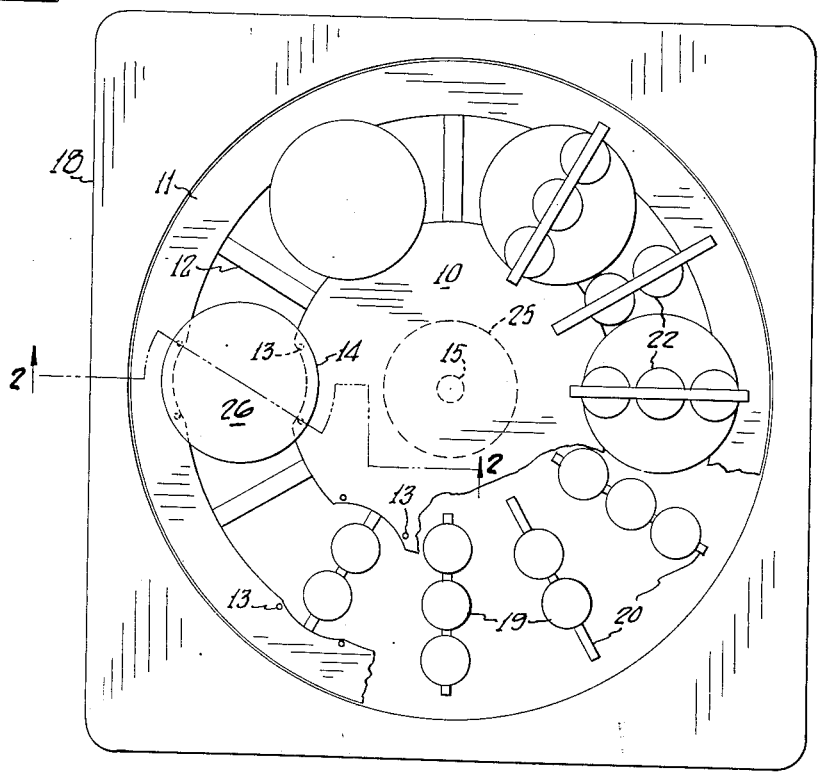
INVENTOR
ELSTON L. IRELAND
ATTORNEY

United States Patent Office 2,762,320
Patented Sept. 11, 1956

2,762,320

APPARATUS FOR BAKING PIES

Elston L. Ireland, Portland, Oreg.

Application January 28, 1952, Serial No. 268,510

4 Claims. (Cl. 107—60)

This invention relates generally to the art of cookery and particularly to an apparatus for baking pies.

The main object of this invention is to provide an apparatus for baking pies by means of which pies can be perfectly baked through and through without over-baking or over-agitating any portion thereof, or causing the contents to boil over and escape from the crust in which it is held.

A further object is to improve the flavor of the pies and reduce the time consumed in the baking operation and reduce the power consumption by one-half of the amount normally required to bake a pie with the usual baking oven.

I accomplish these and other objects in the manner set forth in the following specification as illustrated in the accompanying drawing, in which:

Fig. 1 is a plan view of a representative form of the device.

Fig. 2 is a fragmentary vertical section through the principal elements taken along the line 2—2 in Fig. 1.

Like numbers of reference refer to the same or similar parts throughout the several views.

Referring in detail to the drawing, there is shown a turntable 10 having an outer rim 11 which is held concentric with the table 10 by the spokes 12. Mounted on the members 10 and 11 are the posts 13 which are spaced to support a pie pan 14.

The turntable 10 is mounted on the vertical shaft 15 which is journalled in the bearings 16 supported by the frame 17, around which is placed a concealing casing 18.

Under the pie pans 14 is a lower battery of infra-red ray lamps 19 mounted on a support 20 which is vertically adjustable on the rods 21.

Above the pie pans 14 is mounted an upper battery of infra-red ray lamps 22 which are adjustably carried by the support 23 on the rods 24.

It will be observed in Fig. 1 that the upper and lower lamps are arranged in circumferentially spaced groups, the lamps in each group being disposed side by side in a radial line relative to shaft 15 and the lamps in alternate groups being at different distances from the shaft than the lamps in the intervening groups. Thus staggered radially and circumferentially, the lamps heat overlapping paths in the orbit of the revolving pie pans to cook all parts of the pies uniformly.

The pie pans constituting the baking receptacles are formed of a material permeable to infra-red rays, such as "Pyrex" glass, although paper may also be used.

Rotation is supplied to the shaft 15 by the V-belt pulley 25 from a convenient source of power (not shown). Provision is made for changing the speed, such as by stepping the pulley 25, as illustrated in Fig. 1 or in any convenient manner.

In the operation of the machine, unbaked pies 26 are placed in the pans 14, which are placed on the posts 13 and the table 10 is rotated and the lamps 19 and 22 energized. Due to the penetrating characteristics of the infra-red rays the pies are baked uniformly throughout from the top and bottom without the need of over-baking the crust in order to fully bake tthe filling. The main advantage of this action is to avoid objectionable boiling and agitation of the contents and the preservation of the fresh appearance and flavor when frozen fruits are used.

With all pies normally inclined to run over this tendency is eliminated and the baking is done with a clean oven in half the time normally required and with half of the current consumption, and without pre-heating the oven is normally required.

I claim:

1. An apparatus for baking pies comprising, in combination, a turntable having openings in the periphery thereof, posts disposed on said table around said openings adapted to support a pie pan over the openings, infra-red ray lamps above and below said openings and directed toward said pan, and means for rotating said table between said lamps at different speeds.

2. An apparatus for baking pies comprising, in combination, a turntable having a variable speed drive and having apertures therein along its outer rim, said apertures having upright posts mounted around same and supported by said table, said posts being adapted to engage the under side of a pie pan rim and support the pan over the aperture, and batteries of infra-red ray lamps above and below said table directed toward said table in the orbit of said apertures.

3. An apparatus for baking pies and the like comprising a turntable having openings in the periphery thereof, means for rotating said turntable about a vertical axis, means on said turntable around said openings for engaging the rims of pie pans to support the pans over said openings, and batteries of infra-red ray lamps above and below said table directed toward said table in the orbit of said openings, said lamps being arranged in circumferentially spaced groups, the lamps in each group being disposed side by side in a radial line relative to said axis and the lamps in certain groups being at different distances from said axis than the lamps in other groups to produce overlapping heating effects in said orbit.

4. An apparatus for baking pies and the like comprising a turntable having openings in the periphery thereof, means for rotating said turntable about a vertical axis, means on said turntable around said openings for engaging the rims of pie pans to support the pans over said openings, and batteries of infra-red ray lamps above and below said table directed toward said table in the orbit of said openings, said lamps being staggered radially and circumferentially to heat overlapping paths in said orbit.

References Cited in the file of this patent

UNITED STATES PATENTS

| Number | Name | Date |
|---|---|---|
| 552,667 | Mote | Jan. 7, 1896 |
| 552,838 | Huebner | Jan. 7, 1896 |
| 1,706,186 | Sargent | Mar. 19, 1929 |
| 1,967,933 | Hall | July 24, 1934 |
| 2,099,247 | Whitlock | Nov. 16, 1937 |
| 2,312,814 | Harriss et al. | Mar. 2, 1943 |
| 2,340,354 | Wells | Feb. 1, 1944 |
| 2,549,619 | Miskilla | Apr. 17, 1951 |
| 2,584,584 | Hoffman et al. | Feb. 5, 1952 |